Patented July 8, 1952

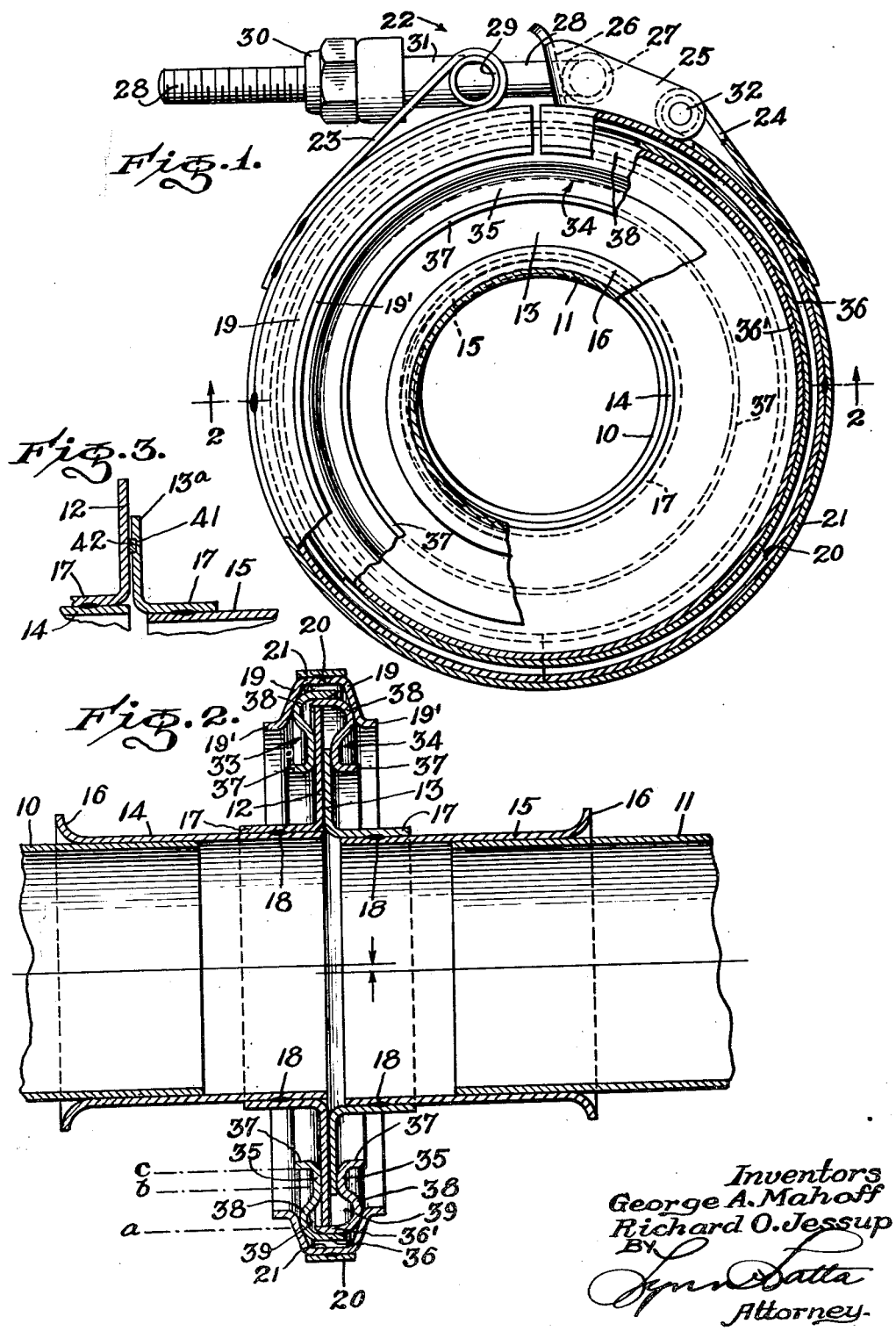

2,602,678

UNITED STATES PATENT OFFICE 2,602,678

FLEXIBLE V BAND TUBE COUPLING

George A. Mahoff, Santa Monica, and Richard O. Jessup, Los Angeles, Calif., assignors to Marman Products Co., Inc., Inglewood, Calif., a corporation of California Application October 17, 1950, Serial No. 190,494

5 Claims. (Cl. 285—129)

1

This invention relates to self-aligning tube couplings and has as its general object to provide a tube coupling of the type in which radially inward forces derived from the constriction of a constrictor band are converted into axial pressures for establishing a fluid tight seal between flanges associated with respective tube sections to be coupled, the coupling being particularly characterized by the embodiment of means for maintaining the seal while allowing axial misalignment of the tube sections.

One of the specific objects of the invention is to provide a coupling in which the seal may be established or maintained between a pair of flat flanges projecting radially outwardly from the respective tube sections, while allowing relative radial movement therebetween. It is preferred to establish the seal by direct contact between the metal faces of the flanges, avoiding the use of packing means, since the use of a packing ring between radially shifting flanges presents a rather difficult problem. However, where an attempt is made to effect a direct metal to metal seal between the flanges, the problem of sealing is accentuated, particularly where it is attempted to fabricate the flanges in the form of sheet metal stampings. This procedure is of course highly desirable from the standpoint of attaining a relatively inexpensive manufacture, but it does inject the problem of inaccuracies arising from spring back and distortions occurring in the stampings as the result of unevenness in the structure of the metal itself or for other reasons. Accordingly, a particular object of the present invention is to provide a means for generating relatively high pressure axial forces which may be evenly distributed around the peripheries of the two engaging flanges, with sufficient effectiveness to press all portions of the flanges in the contact areas thereof, into effective sealing contact and to maintain such contact while permitting relative axial shift between the flanges.

Other objects will become apparent in the ensuing specifications and appended drawings in which:

Fig. 1 is a side view partially broken away and in section, of a coupling embodying the invention;

Fig. 2 is an axial sectional view thereof taken on the line 2—2 of Fig. 1; and

2

Fig. 3 is a fractional sectional view of a modified form of the invention.

As an example of one form in which the invention may be embodied, I have shown in the drawings a coupling in which a fluid type seal is established between tube sections 10 and 11 by a metal to metal contact of flanges 12 and 13 carried by the respective tube sections. The engaging faces of flanges 12 and 13 are flat in order that they may maintain a fairly extensive area of sealing contact in all positions of relative radial shifting adjustment thereof. For best results the engaging faces of these flanges are machined to a fairly high finish (e. g., to the extent of a lapped, or, in some cases, a polished finish).

The invention contemplates the possibility of having flanges 12, 13 either directly attached to tube sections 10, 11 or formed integrally therewith. However, in some installations it may be desirable to provide for universal adjustment between the tube sections including not only the radial shift to compensate for axial misalignment, but also longitudinal telescoping movement to accommodate relative axial shift between the tube sections. To provide for such situations, the invention may, as in the embodiment shown in the drawing, utilize sleeves 14, 15 having belled mouths 16 facilitating the insertion of tube sections 10, 11, thereinto. In some cases, it may be desirable to weld a connecting sleeve 14 or 15 to a tube section 10 or 11, whereas in other cases it may be considered necessary to leave a sliding, telescoping joint between one or both of the connecting sleeves 14, 15 and the respective tube sections. In the latter case, it would of course be difficult to maintain a fluid tight seal, especially in cases where the fluid is passed through the coupling under pressure. However, in some installations such as in the coupling of engine exhaust pipes, the pressure seal may not be essential, and in such cases, the engaging faces of flanges 12, 13 need not be developed to a high degree of finish.

Flanges 12, 13 are provided with collars 17 which receive the unflanged ends of connector sleeves 14, 15 and are joined thereto by suitable means, such as by rings of welding 18.

Axial pressure is derived from a pair of frustoconical wedging members 19 constituting side wall portions of an annulus of channel section including a web portion 20 forming the rim or periphery thereof. Wedging members 19 may be reinforced at their inner margins by axially outwardly projecting flanges 19'.

Annulus 19, 20 is subjected to radial, compressive forces through the constricting action of a constrictor band 21 acting in response to circumferential take-up developed by a connector unit 22.

The ends of band 21 are looped back upon themselves to form loops 23, 24 which are joined by the take-up connector 22. Connector 22 in itself forms no part of the present invention, being of conventional type. Describing the connector for identification purposes, it comprises a yoke or socket 25 having a web portion 26 which is provided with a notch (not shown) to receive the stem of a T-bolt 28 so that head 27 of bolt 28 may be received in socket 25. T-bolt 28 extends through registering openings in a tubular cross bar 29 the ends of which are engaged in separated sections of loop 23 (of bifurcated form—not illustrated—to receive bolt 28) a tightening nut 30 being threaded onto the end of bolt 28 and transmitting pressure to cross bar 29 through a suitable pressure transmitting collar 31. Socket 26 is connected by a suitable cross pin 32 to loop 24.

Axial components of the radial compression to which wedging members 19 are subjected, are developed in a pair of pressure transmitting rings 33, 34. Each of the rings 33, 34 includes a flat body portion 35 engaging a respective flange 12, 13, a generally cylindrical rim 36 (for ring 33, 36' for ring 34), a reinforcing flange 37 at the inner margin thereof, projecting axially in the opposite direction from rim 36, and a semi-toroidal corner portion 38 joining flat body portion 35 to rim 36 or 36'. Corner portion 38 is projected axially away from the flange engaging face of body section 35, so as to provide a clearance space 39 between said body section and the rim 36. Clearance space 39 adjacent flange 12 assures a flat engagement between pressure ring 33 and flange 12 and avoids the concentration of axial pressure transmission between the two at the extreme periphery of flange 12 which would tend to distort the flange 12 from a truly flat plane and to destroy the flat face to face sealing engagement between flanges 12, 13. Preferably, the clearance space 39 is of sufficient radial extent to concentrate the axial pressure of rings 33 and 34 at substantially the periphery of flange 13.

Corner portions 38 have the further function of providing smooth, curved external surfaces for engagement by the wedging jaws 19, reducing to a minimum the friction and galding resulting from the high pressure wedging engagement between jaws 19 and rings 33, 34. Rim flanges 36, 36' differ in radius by the wall thickness of ring 34, and rim flange 36' is telescoped within rim flange 36 for relative axial sliding movement between the rings 33, 34. This telescoping connection maintains the two rings in coaxial relation to each other. The two rings in turn are positioned in coaxial relation to tube section 10 by the snug fitting of the periphery of flange 12 within rim flange 36', with sufficient clearance to allow free axial movement between the two. The inner diameter of rings 33, 34 as defined by reinforcing collars 37, is considerably larger than sleeves 14, 15 whereby a considerable degree of radial shift between flanges 13 and 12, to accommodate misalignment of tube sections 10, 11, is permitted.

Wedging jaws 19 define acute angles of inclination with reference to planes normal to the axes of tube sections 10, 11, the angle in each instance being preferably not more than 30 degrees. The angle shown in the drawing is between 15 and 20 degrees. With this angle of inclination, wedging jaws 19 will resolve radially constricting forces into forces applied axially against curved sections 38 of rings 33, 34, at a ratio of applied force to resultant force within the range of from 1:2 to 1:3.

The radius of contact of wedging engagement between jaws 19 and pressure rings 33, 34 is indicated by the broken line $a$ extending parallel to the axis of the coupling. Similarly, the broken lines $b$ and $c$ indicate respectively the outer and inner radial limits of the area of pressure engagement between rings 33, 34 and flanges 12, 13 respectively. Relief spaces 39 function to concentrate this area of engagement toward the inner margins of rings 33, 34, the radial extent of relief spaces 39 between the radius $a$ of wedging engagement and the outer limit $b$ of pressure engagement being at least as great as the radial distance $b$–$c$ of the area of pressure engagement. As shown in the drawing, the distance $ab$ is approximately twice that of $bc$, although it will be understood that considerable deviation from this ratio may be observed. This arrangement provides for a yielding transmission of pressure through rings 33, 34, of a nature such as to equalize the pressure against flanges 12, 13 in the area $bc$ of pressure engagement. Furthermore, it tends to concentrate the pressure at the periphery of flange 13, for the reason that rings 33, 34 being of a yielding nature, tend to spring toward each other at the radius $a$ of wedging engagement, and to fulcrum against flanges 12, 13 at the radius $b$ of the outer limit of pressure engagement with the flanges 12, 13. This concentration of axial pressure at the periphery of flange 13 is effective to bring about maximum conformation of the engaging faces of flanges 12, 13 to each other at the periphery of flange 13, even in the presence of slight distortional irregularities in the engaging faces, arising from unevenness in the texture of the metal comprising the flanges 12, 13; from uneven stresses set up therein in the forming operation; from inaccuracies in machining of the engaging surfaces; or from other causes. It will be understood that where the coupling elements are fabricated in a relatively inexpensive manner by utilizing sheet metal stampings, that stresses and strains incorporated in the metal during the forming or stamping processes, as well as irregularities in texture of the metal itself, may result in deviations of the engaging faces of flanges 12, 13 from strictly flat planes, and that such deviations, though they may be so slight as to be relatively undetectable, will tend to result in leakage between the flanges.

It will now be apparent that the invention provides for concentration of axial pressures of maximum magnitude in relation to the constricting tension originally developed in constricting band 21, and that such pressures are concentrated at the periphery of flange 13 where they may have maximum effectiveness in overcoming the unsealing effect of distortions in the flanges 12, 13.

The yielding characteristic of rings 33, 34 provides the further advantage of combining maximum sealing pressure at the most effective area, with minimum resistance to radial shifting movement of flange 15 relative to flange 12. This is due largely to the fact that the axial pressures developed in rings 33, 34 within radial zone *ab* are, through the yielding nature of the intervening portions of rings 33, 34, distributed with maximum uniformity to the pressure zone *bc* so that there is no unduly high concentration of pressure at any particular point which might result in a concentration of frictional resistance at that particular point, such as to interfere with the smooth, self-aligning function of the coupling. Accordingly, while relatively high frictional engagement will exist between the pressure rings and the flanges, there will be a maximum freedom of permissible radial movement in relation to the degree of effective sealing pressure applied between the flanges 12, 13.

Where a high pressure seal is required, one of the flanges 12, 13 may have an axially opening annular face groove 31 therein, and an O-ring packing 42 may be received within the groove 41 and engaged under compression between the bottom of the groove and the adjacent face of the other flange. As shown in Fig. 3, groove 41 is formed in flange 13a although it would be obvious that it could equally well be formed in flange 12. Other parts shown correspond to those shown in Fig. 2 and are designated by the same reference characters. The remainder of the coupling may be the same as that shown in Fig. 2.

Where only a relatively small degree of misalignment is provided for, the tube sections and sleeves 14, 15 may, as shown, be of substantially the same diameter. Where considerable misalignment is provided for, however, the downstream tube section may be of a larger diameter so as to avoid any throttling of flow through the coupling when the tube sections are offset relative to each other.

I claim:

1. In a coupling for joining tube sections having flanges projecting radially outwardly from the respective ends thereof, and adapted to establish a sealing connection between said tube sections, a wedging ring of channel section having opposed inwardly diverging split wedging jaws and having means for developing constricting tension therein such as to constrict said jaws radially inwardly, a pair of separate axially opposed resilient pressure rings having, adjacent their inner margins, annular zones of pressure transmitting engagement with the respective flanges and having peripheral portions embraced and engaged between said wedging jaws so as to receive axial pressures therefrom as the resultant of radially inward constriction of said jaws, said peripheral portions being out of contact with the respective flanges and having axial clearance permitting them to yield toward each other under the axial pressures applied thereto by said wedging jaws, whereby to yieldingly transmit said axial pressures to said zones of pressure transmitting engagement with said flanges, said peripheral portions terminating in rim flanges projecting toward each other and telescoped, one within the other for mutual piloting in coaxial relation coupled with relative axial shiftability.

2. In a coupling for joining tube sections, in combination: a pair of sealing flanges attached to the adjacent ends of the respective tube sections and projecting radially outwardly therefrom, said flanges being adapted to establish a sealing connection between said tube sections, a split wedging ring having inwardly diverging frusto-conical jaws and having means for establishing constricting tension therein such as to urge said jaws radially inwardly, and a pair of separate axially opposed resilient pressure rings interposed between said wedging ring and said flanges, said pressure rings being embraced and engaged between said jaws so as to receive axial pressures therefrom as the resultant of radially inwardly directed forces in said jaws, said pressure rings embracing and having pressure transmitting engagement with said flanges for pressing them toward each other to establish said sealing connection, said pressure rings having cylindrical rim flanges projecting toward each other and telescoped, one within the other, the inner of said rim flanges being fitted to and receiving the periphery of one of said sealing flanges, whereby said pressure rings are piloted in coaxial relation to each other and to said one sealing flange, the other of said sealing flanges having a peripheral diameter less than that of said one sealing flange, providing peripheral clearance between said other sealing flange and said telescoping rim flanges, whereby to accommodate axial misalignment of said tube sections while maintaining a sealing connection therebetween.

3. In a coupling for joining tube sections having respective sealing flanges extending radially outwardly from the respective ends thereof, a split wedging ring having opposed, inwardly diverging frusto-conical wedging jaws and having means for developing constricting tension therein to move said jaws radially inwardly, and a pair of separate axially opposed pressure rings having peripheral portions embraced and engaged between said jaws and having inner portions in axial pressure applying relation to the respective flanges for pressing said flanges toward each other to establish a seal between them, at least one of said sealing flanges being arranged with radial clearance between its periphery and said wedging ring and being radially slidable between its adjacent pressure ring and the other sealing flange while subjected to the opposed pressures of said adjacent pressure ring and other flange, for accommodating misalignment of said tube sections while maintaining a seal therebetween.

4. A coupling as defined in claim 3, wherein said pressure rings are of resilient sheet material, and each includes a relatively flat inner portion in engagement with a respective sealing flange, and a toroidal outer portion, arched axially away from the sealing flange surface engaged by said inner portion, said outer portions terminating peripherally in substantially cylindrical rim flanges projecting toward each other and telescoped, for relative axial movement, one within the other, with one of said sealing flanges having radial clearance between its periphery and the inner rim flange and the other sealing flange being of larger diameter than said one sealing flange and piloted within said inner rim flange to maintain a coaxial relation between the pressure rings and said other sealing flange, and with said one sealing flange being axially slidable under pressure between its adjoining pressure ring and said other sealing flange, said toroidal outer portions of the pressure rings being engaged between said wedging jaws and out of contact with the respective sealing flanges, whereby to have axial yieldability while resiliently transmitting axial pressures to said sealing flanges.

5. A coupling as defined in claim 3, wherein said pressure rings are of resilient sheet material; and wherein the said peripheral portions thereof are displaced axially outwardly from the respective planes of said inner portions thereof so as to have axial clearance for yielding movement toward each other while resiliently transmitting pressure to said inner portions.

GEORGE A. MAHOFF.
RICHARD O. JESSUP.

REFERENCES CITED

The following references are of record in the file of this patent:

UNITED STATES PATENTS

| Number | Name | Date |
|---|---|---|
| 711,946 | Day | Oct. 28, 1902 |
| 818,511 | Allen | Apr. 24, 1906 |
| 1,007,326 | Boyd | Oct. 31, 1911 |
| 1,632,042 | Price et al. | June 14, 1927 |
| 2,359,030 | Goldfield | Sept. 26, 1944 |
| 2,424,436 | Crater | July 22, 1947 |
| 2,457,077 | Woolsey | Dec. 21, 1948 |
| 2,519,847 | Neely | Aug. 22, 1950 |